Aug. 19, 1941.  W. H. CURRY ET AL  2,252,836
BELTING AND LINING MATERIAL
Filed Feb. 11, 1939  3 Sheets-Sheet 1
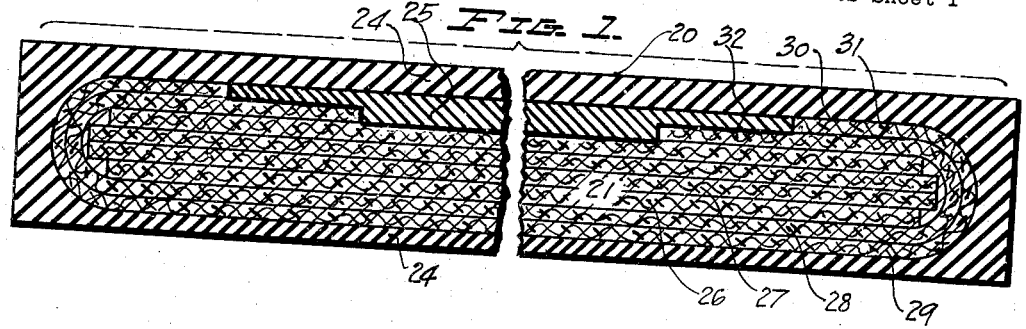
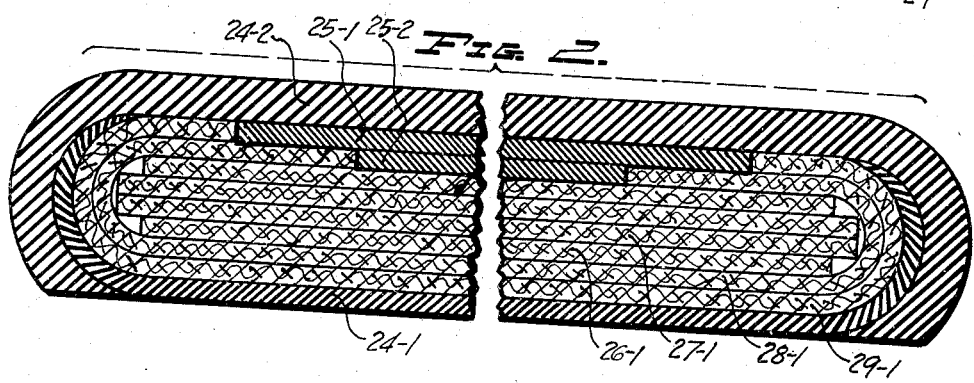
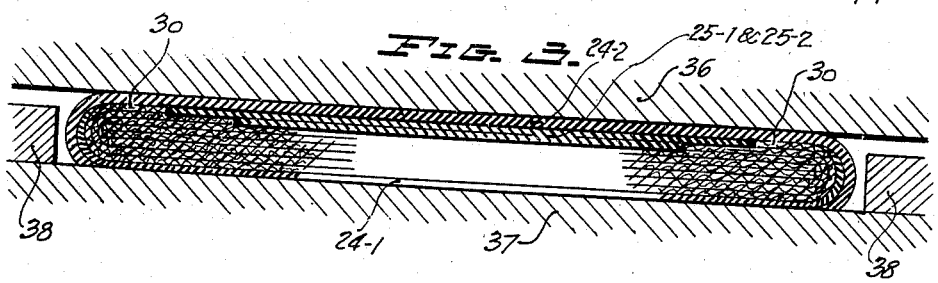
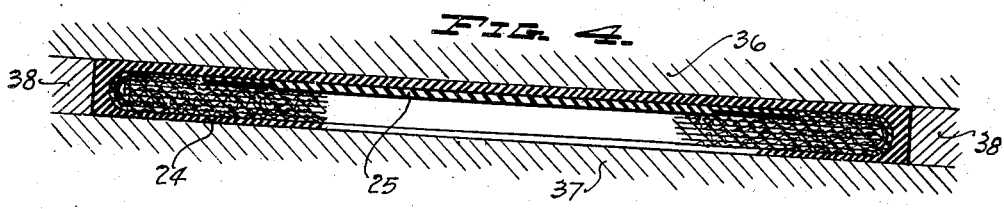
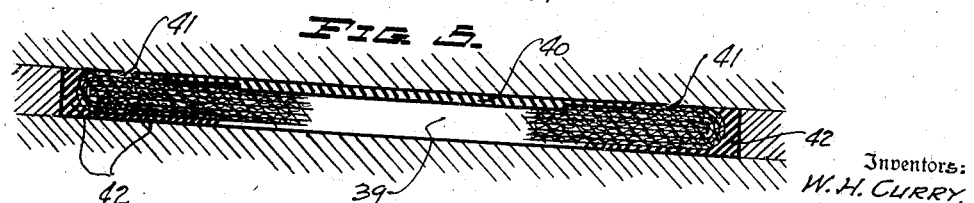
Inventors:
W. H. CURRY,
J. T. POTTS.
By P. H. Mallinckrodt
Attorney

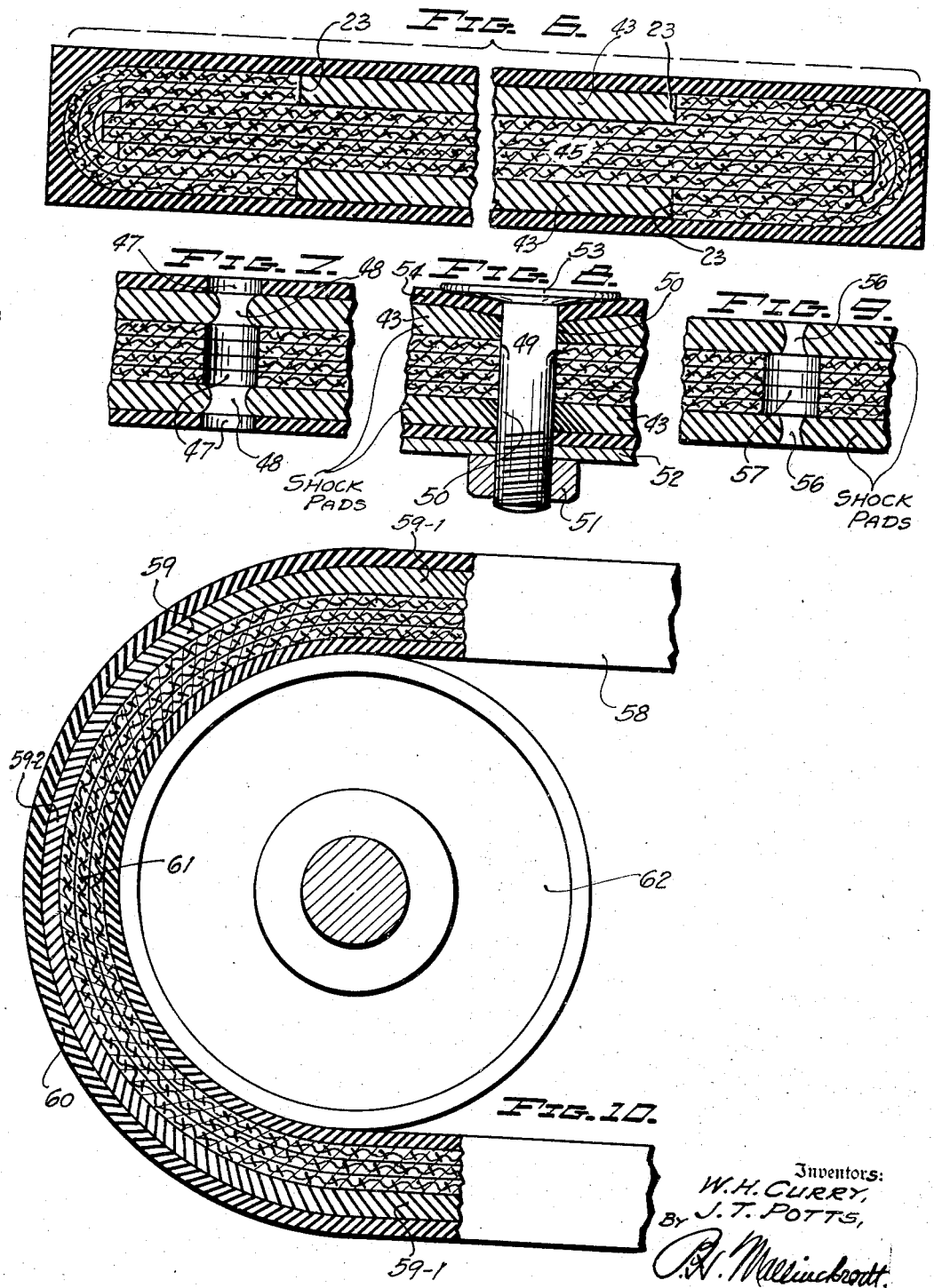

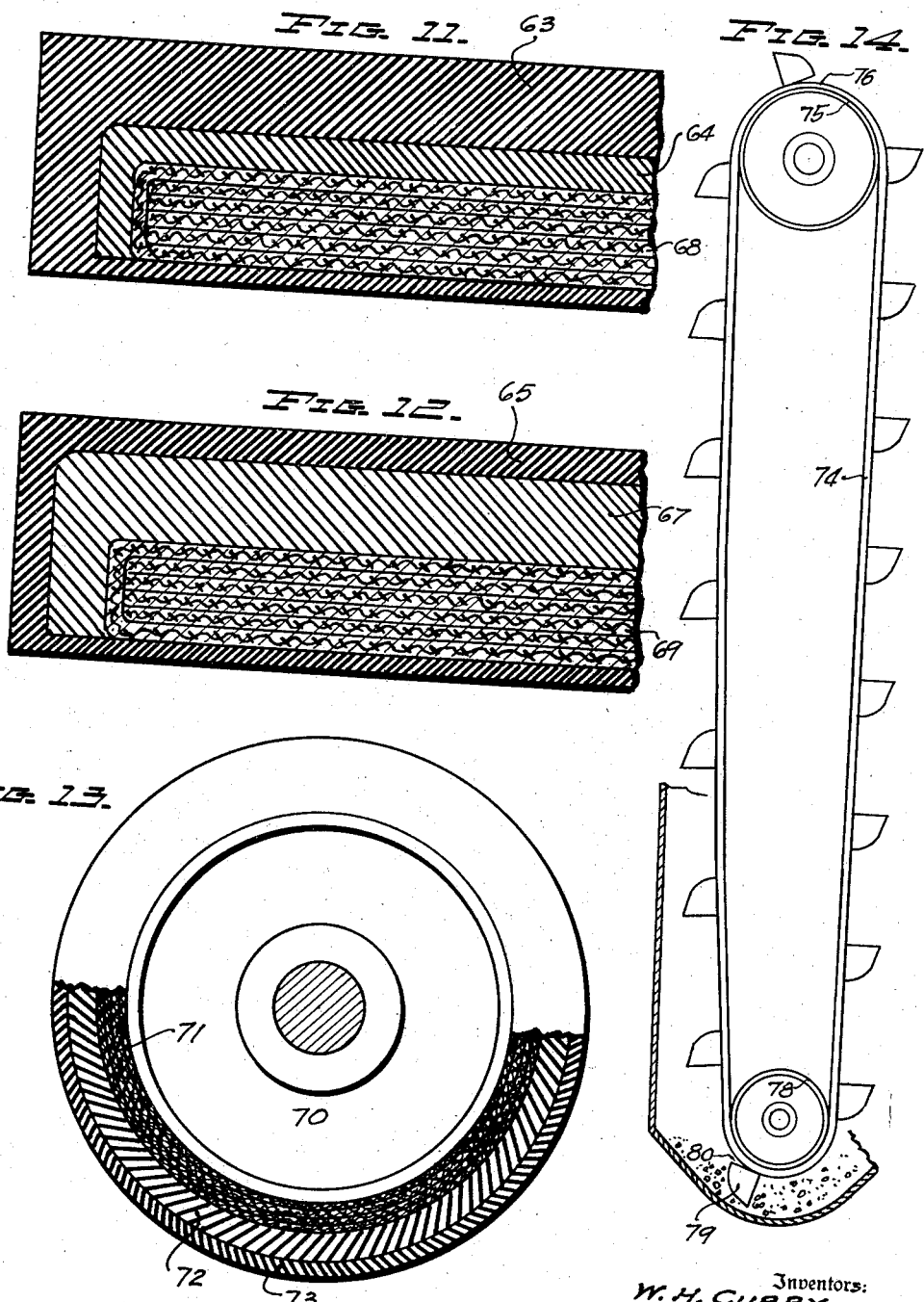

Patented Aug. 19, 1941

2,252,836

UNITED STATES PATENT OFFICE 2,252,836

BELTING AND LINING MATERIAL

Walter H. Curry and John T. Potts, Salt Lake City, Utah

Application February 11, 1939, Serial No. 255,844

9 Claims. (Cl. 74—232)

This invention relates to an improved impact-withstanding and spring-providing material, and its principal objects are:

First. To provide a vulcanized material suitable for bucket elevator belts, conveyor belts, chute linings and so on, the structural organization of which includes an inner portion or carcass, an outer portion or cover, and a soft, resilient or elastic cushion or shock pad preferably made of pure rubber or its equivalent, the resilient cushion or shock pad being of considerable thickness and usually disposed between the carcass and the cover.

Second. To make the soft, resilient cushion a part of the cover if so desired.

Third. To prevent blistering or cracking of the cover, thereby protecting the carcass from moisture and other injurious substances.

Fourth. To provide a method of manufacture, whereby an undue flow of pure rubber or its equivalent during the process of vulcanization, is prevented.

In particular, the invention makes possible the following advantages:

(a) The soft shock pad yields readily when undue pressure is applied to the surface of the cover, and the resiliency of the shock pad eliminates the tendency of the cover to break or puncture, whereas the lack of such a shock pad between the point where pressure is applied and the rigid carcass, results in the rapid destruction of belts in elevator service.

(b) Better contact is secured between the belt and a pulley, resulting in greater resistance to slippage between the two, and therefore in an increase of the power transmitted as well as saving the power otherwise wasted in overcoming slippage.

(c) The tendency of a belt cover to separate or peel from the carcass is eliminated, this being effected by the efficient cushioning of the cover and its tenacious adhesion to the carcass.

(d) The hazard due to elevator bolt heads cutting into the cover and admitting moisture to the carcass, is greatly reduced. This reduction of hazard is effected by sinking the bolt heads into the rubber cover without setting up injurious stresses or tensions in the surface of the cover, it being a well known fact that when rubber is under an undue stress or tension, cutting or other injuries occur much more readily.

(e) The tendency of an elevator belt cover and its carcass to break or puncture back of the elevator buckets, is reduced to a minimum, this being accomplished by providing shock pads on both sides of the belt, thereby securing substantial resistance to the injurious action of the materials being elevated, which are always likely to become wedged between the buckets and the belt, or between the belt and a pulley.

(f) In wet elevator service the absorption or penetration of moisture around the bucket bolts is substantially eliminated, this being brought about because the resistance of the shock pad to distortion is much less than is the resistance of the cover; also, because the initial size of a hole to accommodate a bolt can be much smaller in the soft shock pad than in the carcass or cover, since the soft elastic material of the shock pad allows a bolt to pass through easily and then closes tightly around the bolt as the latter is forced into place.

(g) The stresses on elevator bolts are relieved by reducing the necessary tension set up by drawing or sinking the bolt heads into the cover, such relief being brought about by the resiliency of the shock pad or pads. In ordinary practice, elevator bolts frequently snap because of the extreme stress to which they are subjected when tightened against an unyielding resistance.

Briefly summarized, the invention produces an increase in power efficiency in elevator and conveyor belts due to increased pulley contact; increased flexibility because the soft shock pads allow greater distortion or flexing; increased cover thickness because of better bonding between the different parts of a belt with one another; and greater absorption of impact stresses at loading points, which results in decreased cutting of the cover and consequent breaking down of the carcass.

In general, belts for conveyors and bucket elevators consist of a plurality of layers or plys of heavy cotton duck or other fabric, the successive plys being impregnated with rubber or rubber compounds, thereby forming the carcass which is then encased in a cover of compounded rubber. The carcass with its cover is vulcanized under pressure with the result that the component parts constitute a compact entity. The compounded rubber cover has relatively little resiliency, and being applied against the carcass, as has heretofore been the standard practice, provides only a small degree of cushioning action.

The carcass of a belt gives it stability and strength, and the cover should protect the stability and strength by guarding the carcass against the penetration of moisture and other deteriorating influences. Elevator and conveyor belts are subject to shock, abrasion, cutting, and so on, all of which tend to cause breaks or accidental punctures in the cover, and therefore, to spoil the protection that it is intended to give the carcass. Ordinarily there are definite limits to the thickness of belt covers, but it is a novel feature of the invention that the cover thickness relative to the carcass, may be increased considerably over any belt structure heretofore in use, thus giving the carcass the desired protection.

According to the invention, a layer or pad of material, which, after vulcanizing, has a soft resiliency as well as considerable thickness relative to the carcass, is placed between the cover and the carcass, thereby providing a spring-like action which withstands impact and distortion. If desired, the soft, resilient cushion or shock pad may itself form a part of the cover and be exposed directly to the impact of any loads imposed thereon. The soft, resilient substance, whether located between the cover and the carcass, or itself forming a part of the cover, possesses the property of closing itself tightly around bolts or other fastenings that may pierce or pass through the belt, and at the same time, provides a spring tension against which the head and nut of a bolt may be tightly drawn up, thereby preventing penetration of moisture around the bolt.

In the manufacture of the invention it has been found advantageous, owing to the heavy pressure exerted during vulcanization, and to a consequent tendency to cause the pure rubber or gum layer to "flow", to elevate the marginal portions of the carcass a certain small distance above normal, thereby forming a depression or countersunk channel portion which extends across the face of the structure, and longitudinally therealong. Thus, when the vulcanizing pressure is applied by means of the two platens of a vulcanizing press, the marginal raised portions of the carcass form stops or guards so that the pure gum content of the channel cannot be squeezed out or cause to "flow."

In the drawings, which illustrate several specific embodiments of the invention, Fig. 1 represents a cross-section taken through a finished conveyor belt, drawn to an exaggerated scale, a portion of the section being broken away;

Fig. 2, a cross-section similar to Fig. 1, with the difference that the built-up, unvulcanized belt is shown just before it is compressed and vulcanized;

Fig. 3, a fragmentary cross-section taken through the platens of a vulcanizing press, drawn to a more normal scale, with the raw belt structure of Fig. 2 placed in the press ready for the application of the requisite pressure and heat;

Fig. 4, a cross-section similar to Fig. 3, after the upper platen has been lowered to form the raw belt into its finished vulcanized state;

Fig. 5, a cross-section similar to Fig. 4, but showing a different construction;

Fig. 6, a cross-section, drawn to an exaggerated scale, showing still another construction especially adapted for bucket elevators;

Fig. 7, a fragmentary portion of the belt of Fig. 6, and showing a perforation extending through the belt for the reception of a bucket fastening; for example, a bolt;

Fig. 8, the fragmentary portion of Fig. 7, after a bolt is in place therein;

Fig. 9, a fragmentary cross-section showing another belt construction perforated;

Fig. 10, an elevation, partly in section, of a belt of the invention as it is stressed in going around a pulley;

Figs. 11 and 12, fragmentary cross-sections showing two other constructions embodying the invention;

Fig. 13, an end elevation, partly in cross-section of a conveyor or idler face with material of the invention; and Fig. 14, a side elevation, largely diagrammatic, of a bucket elevator, setting forth some of the adverse conditions encountered in elevator practice and the clarifying the utility of the invention in overcoming such adverse conditions.

Referring to the drawings, the numeral 20, Fig. 1, indicates a belt composed of a carcass 21 and a cover 24, together with a shock pad 25 located between the carcass and the cover. The carcass 21 may be a built-up structure comprising a plurality of superposed layers 26, 27, 28 and 29, of heavy cotton duck or other suitable material, of which some of the outside layers, in this instance two, may be folded around the remaining layers so as to at least partially define the marginal portions 30 which extend longitudinally of the belt. The marginal portions may be formed in various ways, for example by the stepped plies 31 and 32. Stepping the plies, although desirable in many cases, is not absolutely necessary, since the inner edges of the marginal plies may coincide with each other along a marginal portion, as indicated at 23 in Fig. 6. The widths of the marginal portions are matters of individual design and are determined largely by certain required conditions in different cases. The shock pad 25 consists preferably of a soft, resilient or elastic substance, such as substantially pure rubber, vulcanized, and forms a spring cushion between the cover and the carcass. In addition to having soft, springy properties, the material in the shock pad 25 should have also great adhesiveness and tenacity so as to form a strong bond between the carcass and the cover. The cover 24 may be made of compounded rubber as usual, and has comparatively little resiliency.

The purpose of the marginal portions 30, whether formed as indicated in Fig. 1 or as indicated in Fig. 6, is to provide stops or dams to counteract the flow of the soft rubber gum during vulcanization.

It is to be noted that Fig. 1 shows the finished vulcanized structure of the belt, while Fig. 2 shows the structural constitution of the same belt just before vulcanizing. In Fig. 2 an unvulcanized sheet 24—1 forms the lower part of the cover, while another unvulcanized sheet 24—2 forms the upper part thereof. Sheets 25—1 and 25—2 of unvulcanized pure rubber are provided for the shock pads, while the duck plys 26—1 to 29—1 are impregnated with an unvulcanized rubber or rubber compound, which may be of the kind usual in the manufacture of ordinary belts. The unvulcanized structure of Fig. 2 is placed in a vulcanizing press, and by the application of a proper pressure and a proper temperature, it is converted into the finished product of Fig. 1.

Fig. 3 indicates the appearance of the raw structure of Fig. 2 just before the vulcanizing process is applied, and Fig. 4, the appearance of the finished belt of Fig. 1 in the vulcanizing press, just after the vulcanizing process has been completed. In Figs. 3 and 4, the numeral 36 indicates the upper platen and the numeral 37 the lower platen of the vulcanizing press, while the usual side irons are indicated at 38. The utility of the marginal side portions 30 of the belt structure in preventing an undue outward flow of pure rubber during vulcanization, can readily be understood from an inspection of Figs. 3 and 4.

In Fig. 5 is indicated a belt structure 39 wherein the shock pad 40 itself forms the upper cover, and which has its upper surface flush with the marginal portions 41, while the lower cover 42 may be formed of compounded rubber. In this figure the belt is shown in the vulcanizing press and indicates the utility of the marginal portions 41 in preventing the undue flow of the pure rubber of the shock pad 40, as hereinbefore mentioned.

The belt structures in Figs. 1 and 5 have the upper cover thicker than the lower cover, and would ordinarily be used for conveyor purposes. A belt for elevator use is indicated in Fig. 6. Here, two shock pads 43 are provided, one on each side of the carcass 45; the cover in this instance being substantially of equal thickness on both sides of the belt.

The manner in which the soft elastic cushions prevent moisture from the outside from reaching the carcass, is indicated in Figs. 7 and 8. When holes for elevator bolts are punched or drilled through the belt structure of Fig. 6, the same punch or drill which leaves the holes 47 in the carcass and the cover substantially the size of the drill, at the same time leaves the holes through the shock pads definitely smaller than the size of punch or drill, somewhat after the manner indicated at 48. Therefore, when an elevator bolt 49, Fig. 8, is forced through the belt, the shock pads close around, and lightly grip, the bolts at the points 50, thereby forming substantially moisture-tight seals.

When a bolt has a nut such as 51, tightened against the back 52 of a bucket, the head 53 is drawn or sunk into the cover 54, thereby compressing the soft, elastic material in one or both the pads 43 against the springy resistance thereof, with the result that a constant tension is exerted against the lower part of the head 53 by the surface of the cover, so that the bolt is always held tightly, and substantially no moisture enters under the head. Frequently the same drill or punch leaves an opening 56, Fig. 9, even smaller in proportion to the opening 57 through the carcass, than is indicated in Fig. 7.

In Fig. 10 is indicated the functioning of the resilient cushion of the belt in going around a pulley 62. Here the belt 58 has the resilient cushion 59 which normally is of the thickness indicated at 59—1, but when stressed in wrapping the pulley, it is attenuated as indicated at 59—2, thereby providing a spring action between the outer cover 60 and the relatively unyielding carcass 61.

Figs. 11 and 12 indicate the fact that the total thickness of the cover and the shock pad may together greatly exceed the limits of thickness of the cover as observed in ordinary conveyor or elevator belts. In Fig. 11 the cover 63 is of greater thickness than the shock pad 64, while in Fig. 12 the conditions are reversed, the cover 65 being less in thickness than the shock pad 67, the total thickness in both cases being equal to or greater than the thickness of the corresponding carcasses 68 and 69, a condition which has heretofore not been practical to attain, but which is rendered eminently practical by means of the invention.

Fig. 13 indicates the use of the impact-withstanding and spring-providing material as a face covering for pulleys. Here the carcass 71 may be applied directly against the face of a pulley center 70, while a shock pad 72 may be positioned between the carcass 71 and cover 73. If desired, the shock pad 72 may be placed directly against the face of the pulley center 70, thereby eliminating the carcass.

The diagram in Fig. 14 indicates how an elevator belt 74 acts in attenuating the shock pads while going around a pulley 75. The belt 74 may be assumed to be constructed in accordance with Fig. 6, and the maximum attenuation of the shock pads to take place at the point 76, whereby the spring action which is permitted by the shock pads reduces the wear upon the belt to a minimum. In going around a boot pulley such as 78, an elevator bucket 79 pulls its lower portion away from the belt, leaving an open space 80 into which loose matter in the elevator boot, such as sand, gravel, or even small rocks, insinuates itself, and is squeezed between the back of the bucket and the belt as the bucket rights itself. By means of the shock pad of the invention, the interposed solid matter instead of tending to cut into the unyielding cover of the belt, simply presses the cover inwardly against the spring action of the shock pad without harming the cover.

An index to what is meant by the term "soft resiliency" as applied herein to the desired quality of the shock pad, is furnished by a simple comparative test. If a pointed implement, for example an ordinary lead pencil, under a given weight, is pressed against the surface of the material in the shock pad, the pencil point should sink in and form a crater at least several times as deep as the crater formed when the same implement, under the same weight, is pressed against the material of the kind used in the compounded rubber cover.

Another test indicative of the difference in constitution between the soft resilient material used in the novel shock pad of the invention and the material of the usual compounded rubber cover, may consist of comparative standard durometer readings. Such comparative durometer tests register readings of at least 45 to 60 for the compounded rubber, and, only from 30 to 38 for the material of the invention. As to what is meant by a "substantial" thickness for the shock pad—this term means a thickness of at least one-sixteenth of an inch.

The use of breaker strips or other items well known in the art, in connection with the invention, although not shown nor described herein, is contemplated when such use appears to be convenient or desirable.

Having fully described our invention, what we claim is:

1. A laminated sheet belting and lining material comprising a sheet layer of relatively strong and tough flexible material forming a carcass, an intermediate sheet layer of a substantial thickness of soft, dense, resilient rubber bonded to said carcass layer, and a cover sheet of flexible rubber bonded to said intermediate layer, the rubber of said cover sheet being appreciably harder than the rubber of said intermediate layer.

2. A laminated sheet belting and lining material comprising a sheet layer of relatively strong and tough flexible material forming a carcass, an intermediate sheet layer of a substantial thickness of vulcanized, substantially pure gum rubber, having a standard durometer test reading of from 30 to 38, bonded to said carcass layer, and a cover sheet of vulcanized compounded rubber, having a standard durometer test reading of from 45 to 60, bonded to said intermediate layer.

3. A laminated sheet belting and lining material comprising a reinforced sheet carcass layer made up of fabric plies bonded together by flexible elastic rubber, an intermediate sheet layer of a substantial thickness of soft, dense, resilient rubber disposed next to said carcass layer, and a cover sheet of flexible rubber disposed next to said intermediate layer, the rubber of said cover sheet being appreciably harder than the rubber of said intermediate layer, and the said layers and cover sheet being vulcanized together forming an integrally united whole.

4. A laminated sheet belting and lining material comprising a reinforced sheet carcass layer made up of fabric plies bonded together by flexible elastic rubber, an intermediate sheet layer of a substantial thickness of vulcanized, substantially pure gum rubber, having a standard durometer test reading of from 30 to 38, disposed next to said carcass layer, and a cover sheet of vulcanized compounded rubber, having a standard durometer test reading of from 45 to 60, disposed next to said intermediate layer, the said layers and cover sheet being vulcanized together forming an integrally united whole.

5. A laminated belt comprising a carcass portion made up of relatively strong and tough flexible material; a shock pad overlying and bonded to the said carcass and made up of a substantial thickness of soft, dense, resilient rubber; and a cover enclosing and bonded to said carcass and said shock pad, said cover comprising rubber which is appreciably harder than the rubber of said shock pad.

6. A laminated belt comprising a reinforced carcass made up of fabric plies bonded together by flexible elastic rubber; a shock pad overlying the said carcass and made up of a substantial thickness of vulcanized, substantially pure gum rubber, having a standard durometer test reading of from 30 to 38, and a cover enclosing said carcass and said shock pad, said cover being of vulcanized compounded rubber having a standard durometer test reading of from 45 to 60, the said carcass, shock pad, and cover being vulcanized together forming an integrally united whole.

7. A laminated belt comprising a carcass sheet made up of fabric impregnated with flexible elastic rubber, the said carcass sheet having raised longitudinal edge portions on a principal surface thereof, forming a relatively wide channel recess extending along the length of the said material; substantially pure gum rubber, having a standard durometer test reading of from 30 to 38, filling said channel recess substantially flush with the tops of the said raised edge portions of the carcass; said substantially pure gum rubber being vulcanized substantially integrally with the walls which define said channel recess; and a belt cover of compounded rubber vulcanized substantially integrally with the body of the belt and enclosing the same, said belt cover having a standard durometer reading of from 45 to 60.

8. A laminated belt comprising a carcass layer of fabric impregnated with flexible elastic rubber, said carcass layer being sandwiched between layers of substantial thicknesses of soft, dense, resilient rubber and bonded thereto, and an outer cover enclosing the body of said belt, as so comprised, and being bonded thereto, said cover being of rubber which is appreciably harder than the soft rubber of said layers.

9. A laminated belt comprising a carcass layer of fabric impregnated with flexible elastic rubber and having raised longitudinal edge portions mutually spaced apart on at least one of opposite principal surfaces thereof, forming a relatively wide channel recess extending along substantially the length of said belt; soft, dense, resilient rubber filling said recess substantially flush with the respective tops of the said raised edge portions of the carcass and bonded to the walls which define said channel recess; and an outer cover enclosing the body of said belt, as so comprised, and being bonded thereto, said cover being of rubber which is appreciably harder than the said soft rubber filling said recess.

WALTER H. CURRY.
JOHN T. POTTS.